April 13, 1965 W. W. HORSMAN ETAL 3,178,681

HYDROPHONE

Filed Jan. 7, 1960 2 Sheets-Sheet 1

INVENTORS
W. W. Horsman,
W. B. Huckabay &
BY  W. H. Parker

ATTORNEY

United States Patent Office 3,178,681
Patented Apr. 13, 1965

3,178,681
HYDROPHONE
William W. Horsman, William B. Huckabay, and William H. Parker, Dallas, Tex., assignors, by mesne assignments, to Rayflex Exploration Company, Richardson, Tex., a corporation of Texas
Filed Jan. 7, 1960, Ser. No. 1,125
4 Claims. (Cl. 340—10)

This invention relates generally to improvements in transducers, and more particularly, to an improved hydrophone for converting pressure variations generated under water into electrical signals.

As it is well known in the art, a substantial amount of seismic prospecting is being done in areas covered by water. In this type of prospecting, an explosive charge is detonated in the water to generate elastic waves which, after penetrating into the underlying earth, are reflected by the substrata and may be detected by recording the subsequent pressure variations of the water. Various requirements are imposed upon a transducer, or hydrophone, used to detect such pressure variations in the water. In particular, the transducer must have great sensitivity, since the energy contained in the waves reflected by deep-seated formations is obviously small. In addition, the transducer must be insensitive to any motion which it may have relative to the surrounding water. In this connection, it may be noted that movement of a transducer in a body of water will impose various forces on the transducer, such as forces tending to compress the walls of the transducer and forces tending to bend the transducer. For the purpose of this specification and the appended claims, all forces imposed on a device of this character, other than the pressure variations to be measured, may be termed motion forces.

Many different types of hydrophones have been designed to detect pressure variations in a body of water, convert such pressure variations to electrical signals, and transmit the signals to recording equipment carried aboard a ship in the vicinity of the hydrophone. It will be understood that the hydrophones are normally connected to the recording ship by means of cables through which suitable conductors extend for transmitting the signals from the hydrophones to the recording equipment. Prior hydrophones have utilized many types of signal generating elements, such as electrodynamic, electromagnetic, magnetostrictive, electrostatic and piezoelectric elements. Various shapes of piezoelectric members have been utilized, such as members in the form of plates and tubes in an effort to provide a highly sensitive hydrophone. Heretofore, however, the piezoelectric members have been insufficiently supported, or have been too rigidly supported, such that the hydrophone assemblies have either been sensitive to motion forces or have been insensitive to the pressure variations which it is desired to detect.

Prior hydrophones have also experienced difficulty in being capable of detecting low frequency signals (particularly in refraction surveys), while also being insensitive to electrical noise. In order to be responsive to low frequency signals, it has been the practice to utilize a plurality of piezoelectric members connected in parallel to the primary of a transformer located in the hydrophone housing, with the secondary of the transformer connected to the conductor leading through the cable to the recording ship. Such a construction requires a substantial impedance in the conductors to match the impedance of the detector circuit, which in turn makes the assembly responsive to electrical noise, such as stray currents in the water. To overcome these difficulties, some workers in the art have utilized a power amplifier in the hydrophone requiring a substantial number of vacuum tubes and an unduly large power supply which are expensive and difficult to service.

In its broader aspects, the present invention contemplates a hydrophone comprising a tubular, radially strictive member; means electrically responsive to radial deformations of said member; a metal supporting core extending through said member and having a diameter less than the inner diameter of said member to provide an annular chamber between said member and said core; backing material filling said annular chamber providing support for said member around said core to prevent radial deformation of said member in response to motion forces, said backing material having an acoustic impedance less than said core; end plates secured to the opposite ends of said core extending radially outward adjacent the opposite ends of said member, and elastic means secured between the opposite ends of said member and the respective end plates to support said member lengthwise between said end plates and minimize deformation of said member in response to motion forces.

The present invention also contemplates forming the backing material positioned inside of the tubular radially strictive member out of a material having an acoustic impedance substantially identical to the acoustic impedance of the radially strictive member, such that the member will be provided with sufficient internal support against deformation by motion forces, yet the radially strictive member will be highly sensitive to pressure variations in a body of water in which the hydrophone is submerged. The present invention further contemplates a novel transistor amplifying circuit which amplifies signals produced by the radially strictive member and efficiently transmits such signals through the conductors leading to the recording equipment aboard the ship.

An important object of this invention is to provide a novel hydrophone which is substantially more sensitive than previously available seismic hydrophones.

Another object of this invention is to provide an improved hydrophone which is sturdy, easy to assemble, and which is insensitive to any motion forces.

A further object of this invention is to provide a novel hydrophone construction which will efficiently detect pressure variations in a body of water in which the hydrophone is submerged and will efficiently transmit the resulting signals to recording equipment aboard a distant ship.

Another object of this invention is to provide a structurally simple and economical hydrophone construction which will have a long service life.

A still further object of this invention is to provide a hydrophone which is responsive to a wide frequency range of signals, including low frequency signals, and which is substantially insensitive to electrical noise.

Other objects and advantages of the invention will be evident from the following detailed description, when read in conjunction with the accompanying drawings which illustrate this invention.

Figure 1:
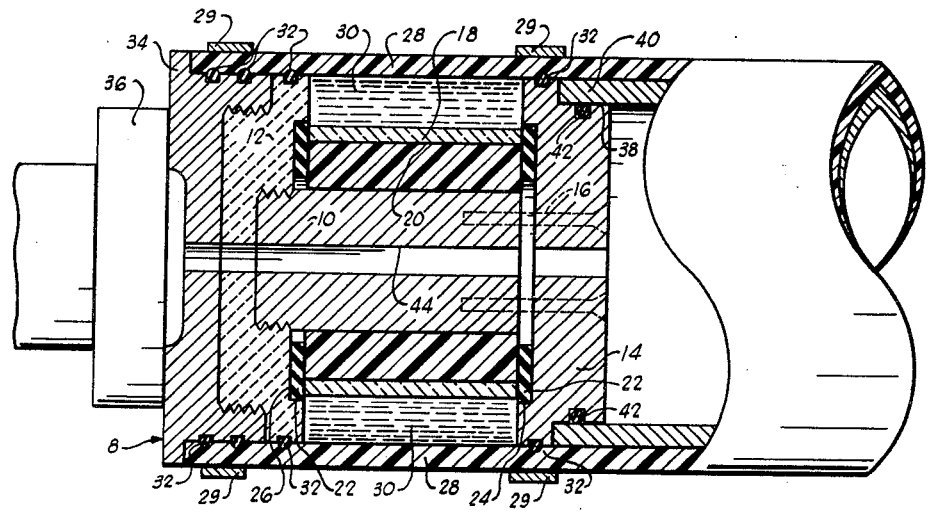
FIGURE 1 is a cross-sectional view through one end and the central portion of a hydrophone constructed in accordance with this invention and illustrates the structural features of the transducing element.

Referring to the drawings in detail, and particularly FIGURE 1, reference character 8 generally designates a hydrophone constructed in accordance with this invention and which includes a core 10 formed out of a structurally strong metal, such as steel, and having end plates 12 and 14 on the opposite ends thereof. The end plate 12 is preferably formed out of Micarta and may be threaded onto the respective end of the core 10. The other end plate 14 is preferably formed out of brass and is secured to the respective end of the core 10 by use of suitable screws 16.

A tubular, radially strictive member 18 is telescoped over the core 10 between the end plates 12 and 14 and has an inner diameter substantially larger than the outer diameter of the core 10 to provide an annular chamber 20 between the core 10 and the member 18. The member 18 may be formed out of any desirable piezoelectric material, such as quartz, tourmaline or barium titanate, which will produce a potential between its inner and outer peripheral surfaces when the member is deformed radially. In this connection, it should also be noted that both the inner and outer peripheral surfaces of the member 18 are preferably coated with a silver plating to facilitate the detection of electrical signals generated by the member 18. The outer peripheral surface of the member 18 may be suitably grounded (not shown) to the end plate 14, and a suitable conductor (not shown) is connected to the inner peripheral surface of the member 18 for feeding the signals produced by the member 18 to a novel transistor amplifier circuit which will be described in connection with FIG. 2. Although the member 18 is very thin, such as .060 inch thick to prevent fracture thereof, it is shown enlarged in FIG. 1 for clarity of illustration.

As illustrated in FIG. 1, the opposite ends of the member 18 extend into proximity with the end plates 12 and 14. A suitable elastic ring 22 is positioned in a mating recess 24 provided in the face of the end plate 14 adjacent the core 10, and another elastic ring 22 is positioned in a mating recess 26 formed in the face of the end plate 12 adjacent the member 18. The elastic rings 22 may be formed out of any suitable material, such as rubber, to support the opposite ends of the member 18 and cushion any possible lengthwise movement of the member 18, such that motion forces tending to bend the member 18 or move the member 18 lengthwise will not cause a reaction by the supports at the opposite ends of the member 18 which would provide deformation of the member 18 and result in the generation of unwanted signals. Also, the chamber 20 between the core 10 and the member 18 is filled with a backing material having an acoustic impedance less than the acoustic impedance of the core 10, and preferably an acoustical impedance equal to the acoustical impedance of the member 18.

The backing material in the chamber 20 may take any suitable form which will provide the desired acoustic impedance. For example, when the member 18 is constructed of barium titanate, we have found that a plastic material comprising an epoxy resin having 80% or more, by weight, hardened steel finely divided particles dispersed therein may be efficiently utilized as the backing material. This plastic material has an acoustic impedance substantially equal to the acoustic impedance of the member 18 and may be presently obtained under the trademark "Devcon" from the Devon Corporation of Danvers, Mass. In this connection, it should be noted that when the material supporting the inner periphery of the member 18 is too rigid, as would be the case with a steel supporting member, reflections take place at the interface between the member 18 and the supporting structure to provide of a loss of energy and interference with the sensitivity of the member 18. Also, when the supporting structure is too rigid, the member 18 is not allowed to contract sufficiently in response to pressure variations to provide the desired sensitivity. On the other hand, when the inner diameter of the member 18 is insufficiently supported, the member 18 will tend to contract or be distorted by motion forces and will then provide unwanted signals which interfere with the desired signals.

The end plates 12 and 14 are circular and have outer diameters larger than the outer diameter of the member 18 to support a tubular sleeve or cover 28 concentrically around, but outwardly of, the member 18. Thus, an annular chamber 30 is provided between the member 18 and the sleeve 28 and this chamber is filled with a suitable oil to protect the member 18 and to transmit pressure variations to the member 18. It is preferred that the sleeve 28 be formed out of a material which has an acoustic impedance substantially transparent to the acoustic energy impinging upon it when submerged to efficiently transmit pressure variations to the member 18. As an example, the sleeve 28 may be formed out of a plastic hose having an inner diameter of a size for a tight fit of the hose around the end plates 12 and 14, and is secured at various points along its length by metal bands 29. In addition, the sleeve 28 extends over the entire length of the hydrophone 8 to protect the various working parts of the hydrophone against the entrance of water. If desired, suitable O-rings 32 are provided around the end plates 12 and 14 and around other portions of the hydrophone 8 to provide an efficient seal with the sleeve 28.

A suitable connector 34 is threadedly secured to the end plate 12 and is provided with an adapter 36 which connects with a cable (not shown) extending from the recording equipment aboard the surveying ship. It will also be observed that the connector 34 is preferably extended into the respective end of the sleeve 28 and is provided with suitable O-rings 32 to seal the respective end of the sleeve.

The outer end portion 38 of the end plate 14 is reduced in diameter to telescopically receive one end portion of a metal tube 40 which extends axially with respect to the core 10 and forms a housing for the electronic circuitry utilized for amplifying the signals generated by the member 18. The tube 40 is preferably formed out of a structurally strong material, such as stainless steel, and has an outer diameter substantially equal to the largest outer diameter of the end plate 14 to be tightly held in the sleeve 28. It may also be noted that an O-ring 42 is also provided around the reduced diameter end portion 38 of the plate 14 to provide a seal against the respective end of the tube 40 and further prevent the possibility of water leaking into the housing formed by the tube 40. Furthermore, before proceeding with a description of the electronic circuitry, it should be observed that a bore 44 is formed through the core 10, the end plates 12 and 14, and the connector 34 to accommodate the conductors (not shown) extending from the electronic circuitry through the cable connected to the adapter 36 and to the recording equipment aboard the surveying ship.

Figure 2:
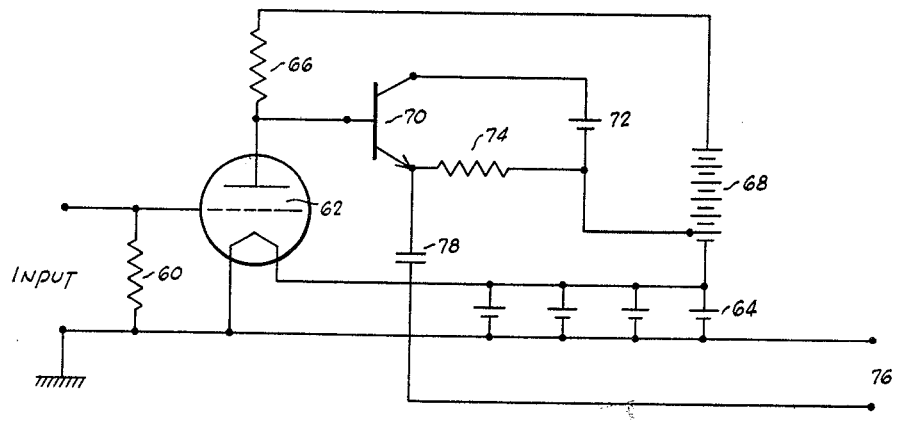
FIGURE 2 is a wiring diagram of the electronic circuitry enclosed within the hydrophone.

As shown in FIG. 2, the input of the amplifier circuit (which is obtained from the member 18) appears across a resistor 60 and is applied to the grid of a low voltage vacuum tube voltage amplifier 62 whose filament is heated by the current supplied from suitable batteries 64. The plate of tube 62 is connected through a resistor 66 to the positive pole of a suitable battery 68 whose potential relative to ground may be, for example, 8.6 volts. The voltage variations developed across the load resistor 66 are applied directly to the base of a transistor 70, such as a 2N365 manufactured by the Texas Instrument Company. The positive pole of a battery 72 is used to bias the collector of the transistor 70 while the load resistor 74 is connected between the negative pole of battery 72 and the emitter of the transistor.

The voltage variations applied to the base of the transistor 70 create current variations in the transistor circuit and appear amplified across the load resistor 74. These variations are transmitted to the output 76 through a condenser 78 which eliminates the D.C. bias. The transistor 70 acts as a power amplifier, such that the signals generated by the amplifier in response to input signals from the transducer member 18 are large enough to pass through the cable leading to the recorder mechanism.

An important feature of this invention resides in the use of a large resistance 60 in parallel with the signal generating transducer 18 as a high impedance input to the vacuum tube 62, rather than the use of several transducers and a transformer as previously has been used and as described in the forepart of this specification. The use of a single transducer provides the advantages of simplicity and economy, along with a good low frequency response which is limited only by the selection of the values of the capacitance of the crystal 18 and of the resistance of the resistor 60. It should also be noted that the inclusion of a power amplifier in the hydrophone renders it possible to keep both the hydrophone and the cable with low impedance, thereby making the entire system less sensitive to electrical noise than has previously been feasible.

Figure 3:
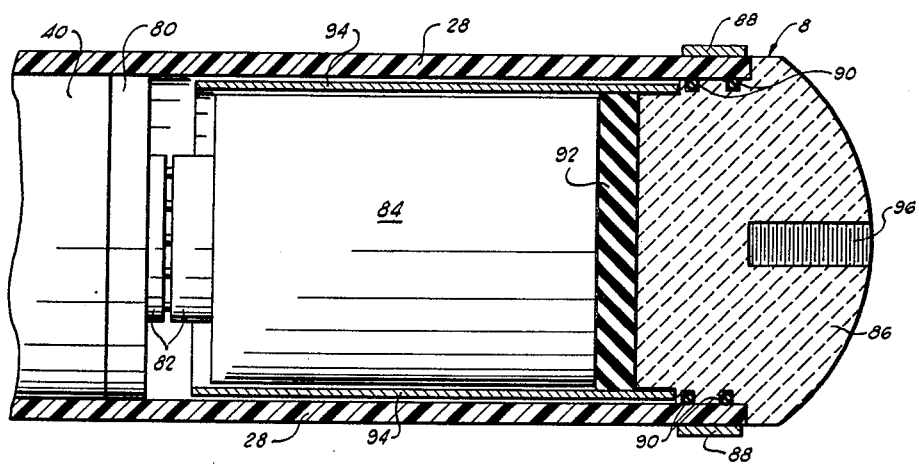
FIGURE 3 is a cross-sectional view (with some of the parts in elevation) of the opposite end of the hydrophone shown in FIG. 1.

Another novel feature of this invention resides in the assembly of the power supplies 64, 68 and 72 for easy and convenient replacement. As shown in FIG. 3, the end of the electronic circuitry housing tube 40 opposite the end plate 14 is provided with a suitable end plate 80 secured to the tube 40 in any desired manner. One-half of a conventional octal connector 82 is carried by the end plate 80 and the other half of the octal connector is secured to one end of a battery pack 84 containing the batteries 64, 68 and 72. The battery pack 84 may be of any suitable construction to hold the batteries in a confined space, and may be obtained, for example, by embedding the various batteries and the respective half portion of the connector 82 in a plastic material, commonly known in the art as "potting." The octal connector 82 is suitably interposed in the electronic circuitry to form a connection between the batteries 64, 68 and 74 and the various other components of the circuitry when the half portions of the connector are engaged as illustrated in FIG. 3.

The plastic sleeve 28 extends concentrically around the battery pack 84 and has a suitable cap 86 secured in the respective end thereof by a quick opening band 88, such as a punch-lock band, encircling the sleeve and cap. Also, suitable sealing rings 90 are preferably positioned between the cap 86 and the sleeve 28 opposite the band 88 to prevent the entrance of water around the cap 86 to the battery pack 84. The cap 86 functions to hold the battery pack 84 in the desired position with the connector 82 engaged. Since the cap 86 will normally be formed out of a hard material, such as Micarta, it is preferred that a layer 92 of soft material, such as sponge rubber, be interposed between the cap 86 and the battery pack 84. Also, a metal sleeve 94 is suitably secured to the cap 86 and extends around the battery pack 84 between the battery pack and the sleeve 28 into proximity with the end plate 80 to protect the battery pack from inadvertent blows.

It will be observed that no switch is provided between the batteries 64, 68 and 74 and the various other components of the electronic circuitry to interfere with the operation of and complicate the circuit. The batteries are connected at all times, and when anyone or all of the batteries run down, it is a simple and fast operation to replace the entire battery pack 84. The band 88 is disconnected to free the cap 86, such that the cap may be removed from the respective end of the sleeve 28. It is usually desirable to provide a threaded bore 96 in the outer end of the cap 86 to receive a suitable tool (not shown) by which a pull may be exerted on the cap. When the cap 86 and sponge rubber 92 are removed, the entire hydrophone 8 is turned until the battery pack 84 is pointed downwardly; whereupon the hydrophone is shaken and the connector 82 will be disconnected and the battery pack will fall out of the respective end of the sleeve 28.

From the foregoing, it will be apparent that the present invention provides a novel hydrophone which is highly sensitive to both high and low frequency pressure variations in a body of water in which the hydrophone is submerged, but is substantially insensitive to motion forces and electrical noise. The piezoelectric tubular member which generates signals in response to pressure variations is supported in the hydrophone in such a manner that the member does not carry physical load and is prevented from moving or bending lengthwise, as well as radially, in response to motion forces. In this connection, it may be noted that the piezoelectric tubular member is made as thin as possible to prevent fracture thereof, and the member is adequately supported both internally and at its opposite ends. It will also be apparent that the present hydrophone is simply constructed, may be economically manufactured, may be easily serviced or repaired, and will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

We claim:

1. A hydrophone, comprising the combination of: a tubular, radially strictive member; means electrically responsive to radial deformations of said member; a metal supporting core extending through said member and having a diameter less than the inner diameter of said member to provide an annular chamber between said member and said core; backing material filling said annular chamber providing support for said member around said core to prevent radial deformation of said member in response to motion forces, said backing material having an acoustic impedance less than said core; end plates secured to the opposite ends of said core and extending radially outward adjacent the opposite ends of said member, and elastic means secured between the opposite ends of said member and the respective end plates to support said member lengthwise between said end plates and minimize deformation of said member in response to motion forces.

2. A hydrophone as defined in claim 1 wherein said backing material has an acoustic impedance substantially equal to the acoustic impedance of said member.

3. A hydrophone as defined in claim 1 wherein said tubular radially strictive member is formed out of barium titanate, and said backing material is formed out of epoxy resin having at least 80%, by weight, hardened steel finely divided particles imbedded therein.

4. A hydrophone as defined in claim 1 characterized further to include a sleeve telescoped over said tubular radially strictive member and having an inner diameter larger than the outer diameter of said member to provide an annular chamber between said sleeve and member, said sleeve also having an acoustic impedance low compared with the acoustic impedance of said member, and oil in the last mentioned annular chamber.

(References on following page)

References Cited by the Examiner

UNITED STATES PATENTS

| | | | |
|---|---|---|---|
| 1,919,480 | 7/33 | Rieber. | |
| 2,233,992 | 3/41 | Wyckoff | 340—10 |
| 2,421,026 | 5/47 | Hall et al. | 340—10 X |
| 2,427,348 | 9/47 | Bond et al. | 340—10 |
| 2,430,013 | 11/47 | Hansell | 340—10 |
| 2,447,333 | 8/48 | Hayes | 340—10 |
| 2,465,696 | 3/49 | Paslay. | |
| 2,529,658 | 11/50 | Massa. | |
| 2,648,056 | 8/53 | Jakosky. | |
| 2,732,536 | 1/56 | Miller | 340—10 X |
| 2,737,639 | 3/56 | Summers et al. | 340—8 X |
| 2,788,513 | 4/57 | Howes. | |
| 2,837,731 | 6/58 | Harris. | |
| 2,857,462 | 10/58 | Lin | 179—1 |
| 2,923,916 | 2/60 | Woodworth | 340—10 X |
| 2,945,208 | 7/60 | Samsel | 340—10 |
| 2,975,396 | 3/61 | Mueller | 340—5 |
| 3,048,815 | 8/62 | Thurston et al. | 340—10 |
| 3,059,217 | 10/62 | Boswell | 340—5 |

KATHLEEN H. CLAFFY, *Primary Examiner.*

FREDERICK M. STRADER, CHESTER L. JUSTUS,

*Examiners.*